United States Patent
Fransen

(10) Patent No.: US 10,380,608 B2
(45) Date of Patent: Aug. 13, 2019

(54) MARKETING DATA COMMUNICATION CONTROL

(71) Applicant: Adobe Inc., San Jose, CA (US)

(72) Inventor: Peter R. Fransen, Soquel, CA (US)

(73) Assignee: Adobe Inc., San Jose, CA (US)

( * ) Notice: Subject to any disclaimer, the term of this patent is extended or adjusted under 35 U.S.C. 154(b) by 656 days.

(21) Appl. No.: 14/853,496

(22) Filed: Sep. 14, 2015

(65) Prior Publication Data

US 2017/0076298 A1   Mar. 16, 2017

(51) Int. Cl.
*G06Q 10/00* (2012.01)
*G06Q 30/02* (2012.01)
*H04W 4/70* (2018.01)

(52) U.S. Cl.
CPC .......... *G06Q 30/0201* (2013.01); *H04W 4/70* (2018.02)

(58) Field of Classification Search
CPC .... G06Q 30/0201; H04W 4/70; H04W 4/005; G06F 3/0484
USPC ........................................ 705/7.29
See application file for complete search history.

(56) References Cited

U.S. PATENT DOCUMENTS

| | | | |
|---|---|---|---|
| 6,275,824 B1 * | 8/2001 | O'Flaherty | G06F 21/6227 |
| 6,480,850 B1 * | 11/2002 | Veldhuisen | G06F 21/6245 |
| | | | 707/600 |
| 7,406,436 B1 * | 7/2008 | Reisman | G06Q 30/02 |
| | | | 705/7.32 |
| 7,536,360 B2 * | 5/2009 | Stolfo | G06Q 10/087 |
| | | | 705/64 |
| 7,630,986 B1 * | 12/2009 | Herz | G06Q 10/10 |
| 8,060,402 B1 * | 11/2011 | Ranganath | G06Q 30/02 |
| | | | 705/14.73 |
| 8,086,492 B2 * | 12/2011 | Ashbaugh | G06F 17/211 |
| | | | 705/14.15 |
| 8,301,787 B2 * | 10/2012 | Li | G06F 17/30867 |
| | | | 709/217 |
| 10,074,136 B2 * | 9/2018 | Singh | G06Q 40/06 |

(Continued)

OTHER PUBLICATIONS

Krishnamurthy, et al., "Measuring Privacy Loss and the Impact of Privacy Protection in Web Browsing", In Proceedings of the 3rd Symposium on Usable Privacy and Security, Jul. 18-20, 2007.*

(Continued)

*Primary Examiner* — Hafiz A Kassim
(74) *Attorney, Agent, or Firm* — SBMC

(57) ABSTRACT

Marketing data communication control techniques and systems are described. A digital environment is described in which a plurality of devices are configured to communicate marketing data to one or more of a plurality of marketing services. One or more inputs are received that are entered by a user through interaction with the single unified user interface of the computing device, the one or more inputs specifying marketing data communication settings to control communication of marketing data per individual ones of the plurality of devices and per individual ones of the plurality of marketing data collection services. The marketing data communication settings are propagated by the computing device to respective ones of the plurality of devices, the propagated marketing data communication settings configured to control communication of marketing data by the respective said devices to respective ones of the plurality of marketing data collection services.

17 Claims, 7 Drawing Sheets

(56) References Cited

U.S. PATENT DOCUMENTS

| | | | | |
|---|---|---|---|---|
| 2003/0028430 A1* | 2/2003 | Zimmerman | G06Q 30/02 | 705/14.64 |
| 2003/0097383 A1* | 5/2003 | Smirnov | G06Q 10/10 | |
| 2004/0199767 A1* | 10/2004 | Gross | H04L 63/102 | 713/168 |
| 2005/0015429 A1* | 1/2005 | Ashley | G06F 21/6263 | 709/200 |
| 2005/0069098 A1* | 3/2005 | Kalervo | H04L 29/06 | 379/88.13 |
| 2006/0242154 A1* | 10/2006 | Rawat | G06F 17/30126 | |
| 2007/0061452 A1* | 3/2007 | Weinstein | G06Q 30/02 | 709/224 |
| 2007/0067297 A1* | 3/2007 | Kublickis | G06Q 30/02 | |
| 2008/0010206 A1* | 1/2008 | Coleman | G06F 21/6254 | 705/51 |
| 2008/0227440 A1* | 9/2008 | Settepalli | H04M 1/274558 | 455/418 |
| 2008/0263584 A1* | 10/2008 | Salo | G06Q 30/02 | 725/32 |
| 2009/0013399 A1* | 1/2009 | Cottrell | H04L 63/0421 | 726/12 |
| 2009/0265257 A1* | 10/2009 | Klinger | G06Q 30/02 | 705/26.1 |
| 2009/0327401 A1* | 12/2009 | Gage | G06F 15/16 | 709/203 |
| 2010/0024045 A1* | 1/2010 | Sastry | G06F 21/6245 | 726/28 |
| 2010/0077484 A1* | 3/2010 | Paretti | H04W 4/21 | 726/26 |
| 2010/0094710 A1* | 4/2010 | Ramakrishna | G06Q 30/02 | 705/14.64 |
| 2010/0306154 A1* | 12/2010 | Poray | G06Q 30/02 | 706/47 |
| 2012/0066084 A1* | 3/2012 | Sneyders | G06Q 30/02 | 705/26.1 |
| 2012/0084348 A1* | 4/2012 | Lee | G06Q 30/02 | 709/203 |
| 2012/0191504 A1* | 7/2012 | Parikh | G06Q 30/0201 | 705/7.29 |
| 2013/0232030 A1* | 9/2013 | Gockeler | H04L 67/22 | 705/26.8 |
| 2014/0006309 A1* | 1/2014 | Reisman | G06Q 30/02 | 705/347 |
| 2014/0089109 A1* | 3/2014 | Ashbaugh | G06F 17/211 | 705/14.73 |
| 2014/0201664 A1* | 7/2014 | Guilleminot | H05B 1/0263 | 715/771 |
| 2014/0297417 A1* | 10/2014 | Cusack | G06Q 30/02 | 705/14.61 |
| 2014/0372853 A1* | 12/2014 | Barry | G06Q 40/04 | 715/212 |
| 2015/0006719 A1* | 1/2015 | Gupta | H04L 67/16 | 709/224 |
| 2016/0098759 A1* | 4/2016 | Lien | G06Q 30/0267 | 705/14.64 |
| 2016/0188886 A1* | 6/2016 | Weiss | G06Q 40/04 | 726/26 |

OTHER PUBLICATIONS

Venkatesh Shankar & Sridhar Balasubramanian (Mobile Marketing: A Synthesis and Prognosis, ScienceDirect, Journal of Interactive Marketing 23 (2009) 118-129) (Year: 2009).*

* cited by examiner

600 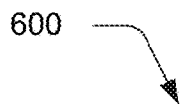

602
Transmit a communication by a device for receipt by a computing device to opt-in to functionality of the computing device to control communication of marketing data by the device that is collected by the device

604
Receive marketing data communication settings by the device that are propagated by the computing device, the marketing data communication settings configured to control communication of individual types of the marketing data by the device to respective ones of a plurality of marketing data collection services

*Fig. 6*

MARKETING DATA COMMUNICATION CONTROL

BACKGROUND

With the advent of the Internet of Things (IoT), the amount of devices available to users in even everyday scenarios has exploded. In one example, the prevalence of wearable devices continues to increase with the development of watches, fitness bands, shoe pods, and so forth. In other examples, this technology has also continued to expand across home appliances (e.g., thermostats, refrigerators, heating vents, coffee makers), automobiles, televisions, and so on.

Thus, todays users are confronted with a digital environment having a multitude of devices that are configured to expand user functionality and convenience. Further, each of these devices may collect a variety of data that is then disseminated, often without user control.

SUMMARY

Marketing data communication control techniques and systems are described. In one or more implementations, a digital environment is described in which a plurality of devices are configured to communicate marketing data to one or more of a plurality of marketing services. In this digital environment, a method of controlling marketing data communication via a single unified user interface of a computing device is described. One or more inputs are received that are entered by a user through interaction with the single unified user interface of the computing device, the one or more inputs specifying marketing data communication settings to control communication of marketing data per individual ones of the plurality of devices and per individual ones of the plurality of marketing data collection services. The marketing data communication settings are propagated by the computing device to respective ones of the plurality of devices, the propagated marketing data communication settings configured to control communication of marketing data by the respective devices to respective ones of the plurality of marketing data collection services.

In one or more implementations, in a digital environment to control marketing data communication via a single unified user interface, a system includes a display device, a wireless communication device, and a processing system and memory configured to implement a marketing data manager module. The marketing data manager module is configured to receive one or more inputs entered by a user through interaction with the single unified user interface displayed on the display device, the one or more inputs specifying marketing data communication settings to control communication of individual ones of a plurality of different types of marketing data per individual ones of a plurality of devices that are communicatively coupled via the wireless communication device. The module is also configured to propagate the marketing data communication settings by the wireless communication device to respective ones of the plurality of devices. The propagated marketing data communication settings are configured to control communication of marketing data by the respective devices to respective ones of a plurality of marketing data collection services.

In one or more implementations, in a digital environment to control marketing data communication, a method includes transmitting a communication by a device for receipt by a computing device to opt-in to functionality of the computing device to control communication of marketing data by the device that is collected by the device. The method as includes receiving marketing data communication settings by the device that are propagated by the computing device, the marketing data communication settings configured to control communication of individual types of the marketing data by the device to respective ones of a plurality of marketing data collection services.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 6 is a flow diagram depicting another procedure in an example implementation in which techniques to control communication of marketing data are described.

DETAILED DESCRIPTION

Overview

Figure 1:
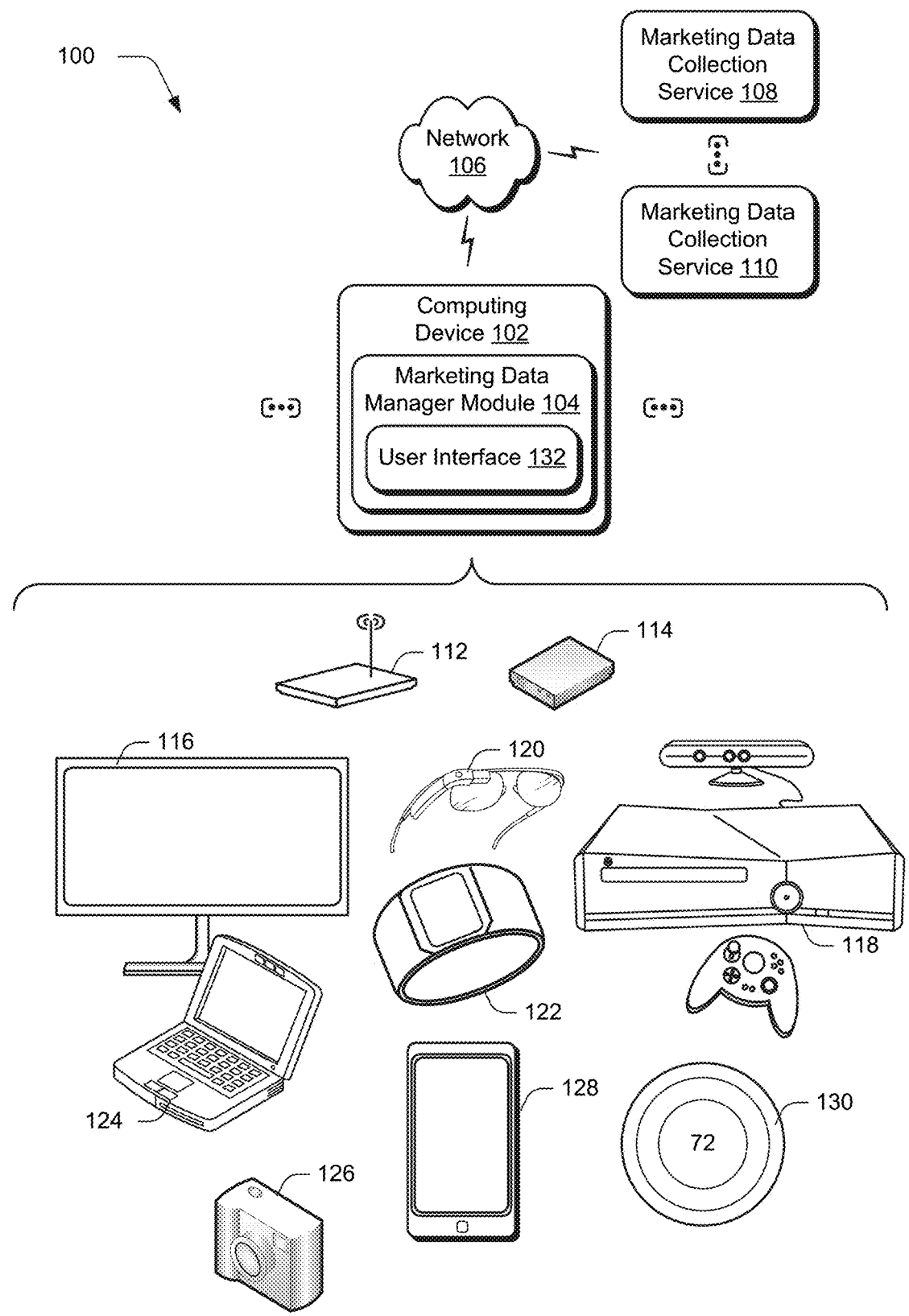
FIG. 1 is an illustration of a digital environment in an example implementation that is operable to employ marketing data communication control techniques described herein.

The continuing increase in devices in digital environments as a result of the Internet of Things, including wearable technology and home electronics has resulted in a corresponding increase in an amount of marketing data being collected and communicated by the devices within the digital environment. This data may contain personal information, heuristics about an environment in which the device is used (e.g., power usage, number of eggs within a refrigerator, when a user is home) and other information that is typically considered confidential to a user.

Accordingly, this digital environment may collect marketing data that describes user interaction with the device, operation of the device itself, and so forth. This marketing data is typically collected and reported back to the user (e.g., a number of steps taken), but may also be obtained by marketing data collection services, such as to inform a user that it a good time to order new shoes. With both the diversity of devices and the type of marketing data being collected, however, these users lack an ability to determine and control which marketing data is collected and communicated, which may seem intrusive to users and thus cause users to forgo use of these devices or avail themselves of functionality supported through communication of this data.

Although some devices support an ability to restrict communication of this data, such restrictions are limited to use by the individual devices and are also configured specifically for those devices. Accordingly, even if a user is able to determine that a device includes an ability to restrict this communication, the user is forced to manually learn the nuances of implementation of this functionality for individual devices, which is time consuming, frustrating, and limits a user's experience with a digital environment that includes such devices. Further complicating this process is that in some instances a user may actually desire to have this information communicated.

Marketing data communication control techniques and systems within a digital environment are described. In one or more implementations, a single unified user interface is provided via which a user may control communication of which marketing data is communicated by which devices in the digital environment. These control techniques include specification of which types of marketing data (e.g., personal information, usage information) are permitted or restricted from communication by individual devices to individual marketing data collection services.

Marketing data may vary based on differences in functionality of devices that generate the data. As such, marketing data may include different types of data, such as data describing user interaction with the device, data describing operation of the device, data describing interaction with other devices in the digital environment, and so on. Marketing data may also include types of data that are considered confidential to a user, such as information that describes user interaction with devices (e.g., where and how much such as steps), personally identifiable information (e.g., user name, account information), and so forth.

The marketing data is then leveraged in a variety of ways, which includes exposure to a user as well as third parties that are referred to as marketing data collection services described herein. The marketing data collection services are configurable to consume marketing data in a variety of different ways. For example, a running shoe configured as part of the Internet-of-Things may be configured to collect marketing data describing usage of the shoe, e.g., number of steps, timing of the steps. A marketing data collection service associated with a manufacturer of the shoe may use the marketing data to serve ads for other shoes, suggest when to buy a new shoe, and so forth. On the other hand, a marketing data collection service associated with a fitness website may be used to track workouts. Accordingly, through interaction with the single unified user interface a user may control communication such that communication of the marketing data is permitted for the fitness website but restricted from communication to the manufacturer. In this way, a user may receive feedback as desired and have an ability to control communication of this data which was not possible using conventional systems as further described below.

The digital environment described herein may also include functionality to ascertain which marketing data control functionality is supported by individual devices and a determination of which devices have opted-in to control via the single unified user interface. In this way, a user may interact with a single user interface to permit and restrict communication of marketing data as desired without individual manual interaction with each of the devices and without learning nuances of how this functionality is implemented by each of the devices, thereby improving user interaction and desirability of the devices as a whole. Further discussion of these and other examples is included in the following sections and shown in corresponding figures.

In the following, marketing data describes data collected by devices as part of the internet-of-things and which is then disseminated to marketing services. The types of marketing data may thus vary as greatly as the devices used to generate the data, such as usage data that describes a user's interaction with the device, operational data that describes operation of the device itself (e.g., power levels, positional data), and so forth. Marketing data collection services collect and consume this marketing data for a variety of purposes, such as to serve ads, suggest replacement devices, servicing of the devices, and so on through a network connection between the device and the service. The single unified interface is an interface that may be output by any one of the devices within the digital environment that is usable to control dissemination of marketing data by the device as well as other devices in the environment.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital environment 100 in an example implementation that is operable to employ marketing data control techniques described herein. The illustrated environment 100 includes a computing device 102, which may be configured in a variety of ways along with devices included as part of a digital environment at a single premises such as a household, work location, and so on as further described in relation to FIG. 2.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 7.

The computing device 102 is illustrated as included with a variety of devices within the digital environment 100 as part of the Internet-of-Things (IoT). The Internet-of-Things describes a digital environment having a plurality of devices with connectivity (e.g., network functionality such as wired or wireless communication devices) to communicate data for receipt by a user or other devices. This allows communication of information to support sensing and control of objects, thereby creating opportunities for integration between a physical environment and these devices. This is used to support functionality to improve efficiency, accuracy, and aide device manufacturers as well as users of the devices.

Illustrated examples of devices as part of this digital environment include communication devices such as a wireless router 112 and wired modem 114, e.g., a cable modem, DSL modem, satellite modem, and so forth. Additional examples of devices include content consumptive devices such as a television 116 and game console 118. Wearable devices are also included as part of the digital environment 100 such as glasses 120 and watches 122. Traditional personal computers are included such as a laptop 124 or desktop PC. Content capture devices such as a microphone or camera 126 are also part of this digital environment 100, as well as mobile communication devices such as tablet computers or mobile phones 128. Appliances are also included such as washing machines, refrigerators, coffee makers, vents, thermostats 130, and so forth. Other examples are contemplated and thus, as is readily apparent, a digital environment 100 of a typical user's home, work location, and so on may include a multitude of devices supporting a variety of functionality.

As described above, part of the provision of functionality within this digital environment 100 involves communication of data, such as to a user of the device directly, to other devices within a premises of the digital environment 100, and also "outside" of the premises such as over the network 106. This data includes marketing data that is collected by marketing data collection services 108, 110 to support a variety of functionality within the digital environment 100 as described in the Overview. Examples of the functionality include suggestions and recommendations (e.g., for content to be consumed), marketing and advertising, and so on. As such, marketing data may also include data that is considered confidential to a user, such as information that describes user interaction with devices (e.g., where and how much such as steps), personally identifiable information (e.g., user name, account information), and so forth.

The digital environment 100 as illustrated includes a marketing data manager module 104. The marketing data manager module 104 is representative of functionality (e.g., implemented at least partially in hardware of one or more devices as further described in relation to FIG. 7) to control communication of marketing data by the devices within the digital environment 100. The marketing data manager module 104 is configured to implement a single unified user interface 132 via which a user may interact to control communication of individual types of marketing data by individual ones of the plurality of devices to individual ones of a plurality of marketing data collection services 108, 110. In this way, rather than forcing a user to individually interact with each of the devices and to learn which functionality, if any, is supported by the devices to control communication of this data, the user instead interacts with the user interface 132 and has a result of that interaction propagated through the digital environment 100 as marketing data communication settings. Further discussion of marketing data communication control is included in the following and shown in corresponding figures.

Figure 2:
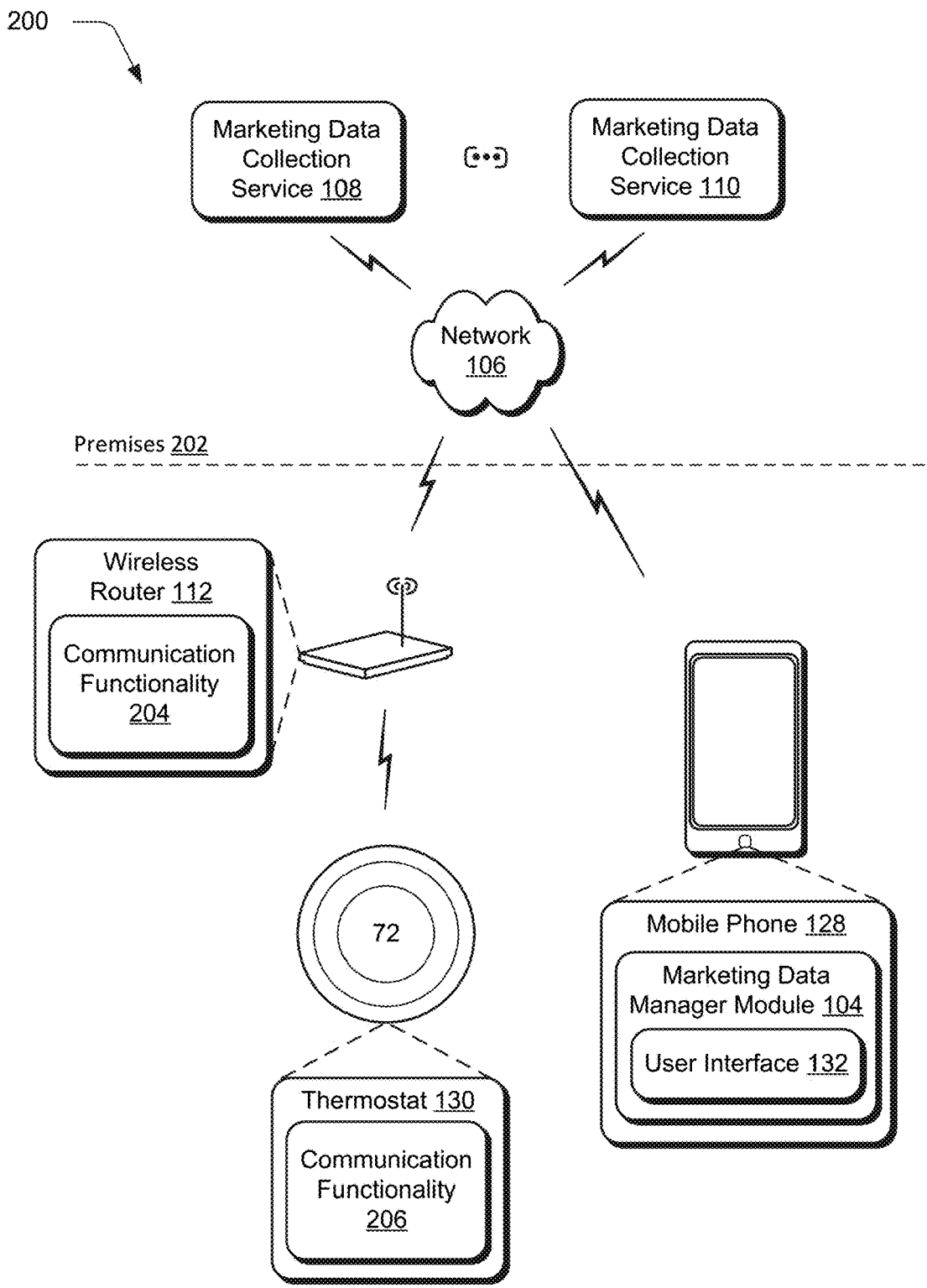
FIG. 2 depicts a system including devices included in the digital environment of FIG. 1 showing examples of arrangement of communication of marketing data by the devices.

FIG. 2 depicts a system 200 including devices included in the digital environment 100 of FIG. 1 showing examples of arrangement of communication of marketing data by the devices. In this example, a premises 202 (e.g., a physical geographic location such as a house, retail establishment, or office) is shown that includes computing devices selected from FIG. 1 that include the wireless router 112, mobile phone 128, and thermostat 130. Each of these devices in this example includes communication functionality 204, 206 that is usable to generate and communicate marketing data by the respective device. In one example, the thermostat 130 is configured to communicate with the network 106 via the wireless router 112. Communication independent from the wireless router 112 may also be performed in the premises 202, such as by the mobile phone 128 directly with the network 106.

The mobile phone 128 is illustrated as including the marketing data manager module 208, although any of the devices in this system 200 and even in the digital environment 100 of FIG. 1 may include this functionality. A user in this example interacts with the user interface 132 of the marketing data manager module 104 to control communication of marketing data by the mobile phone 128.

Interaction with the user interface 132 may also be used to control communication of marketing data by the wireless router 112 and thermostat 130, either directly or indirectly. In one example, communication functionality 206 of the thermostat 104 in one instance supports control of marketing data communication by the device, such as where this data is sent and what types of data, e.g., temperature versus when a presence is detected. Accordingly, in this example the marketing data manager module 104 communicates marketing data communication settings directly to the thermostat 130 to implement desired control, e.g., to permit communication of types of marketing data such as temperature and time but not types of marketing data indicating when a user's presence is detected by the device.

In another example, the thermostat 130 is not configured to support this type of control, but rather automatically communicates the data through a wireless router 112. Accordingly, in this instance the mobile phone 128 communicates marketing data communication settings to the wireless router 112 that identifies the individual device (e.g., the thermostat) that originates the marketing data to be controlled as well types of marketing data that are permitted or restricted from communication, e.g., temperature versus presence information. Thus, the user interface 132 may be used to control communication of marketing data directly or indirectly within a digital environment. This control may also be configured to support different levels of granularity, such as to indicate individual devices, individual types of marketing data that are permitted or restricted by the individual devices, as well as locations that are permitted or restricted from receiving this information as further described in the following regarding user interaction with the user interface 132.

Figure 3:
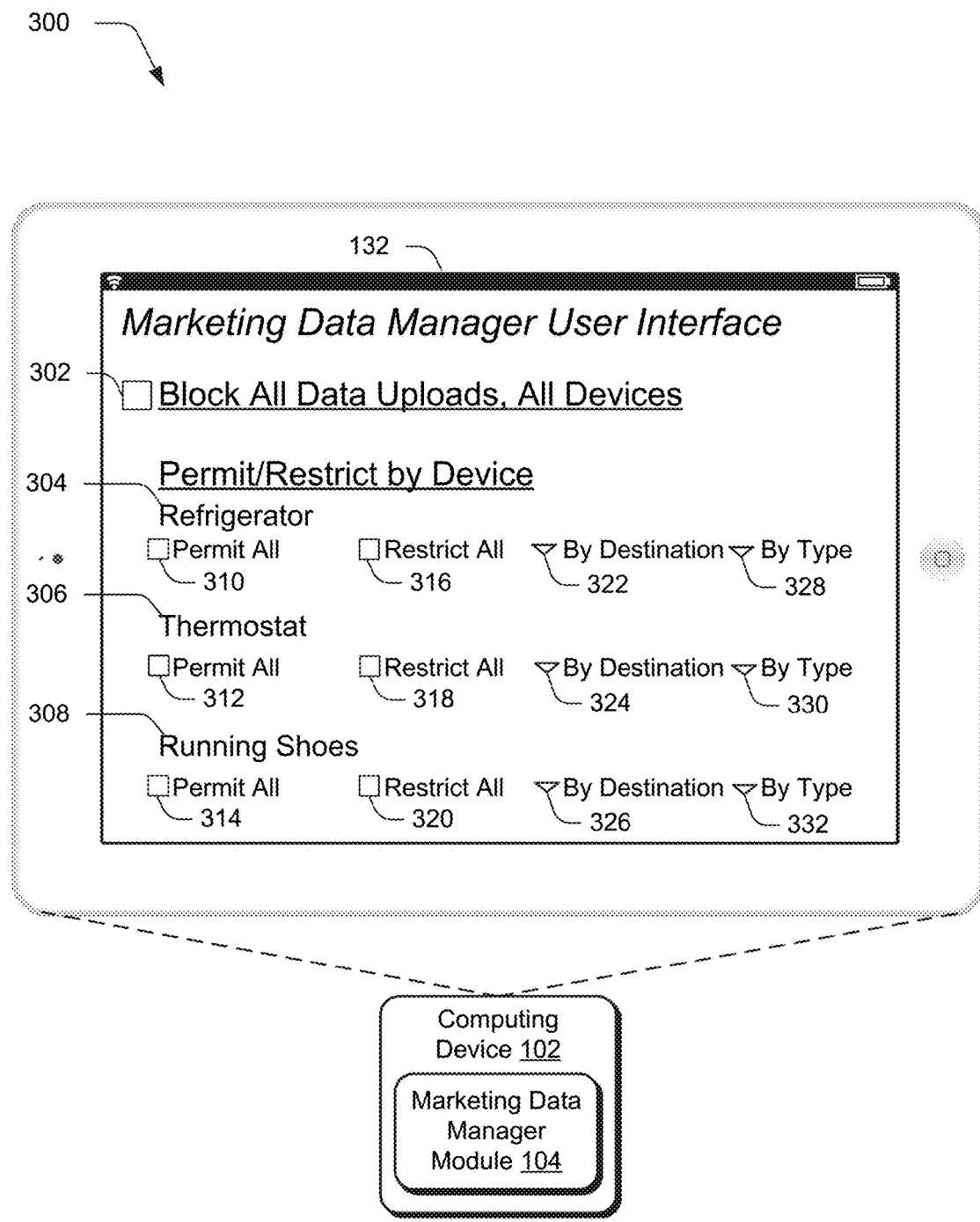
FIG. 3 depicts an example of a user interface 132 FIG. 2 that is configured to specify individual devices, communication of individual types of marketing data, and destinations of the marketing data that are permitted or restricted.

FIG. 3 depicts an example 300 of the user interface 132 of FIG. 2 that is configured to specify individual devices, communication of individual types of marketing data, and destinations of the marketing data that are permitted or restricted. In this example the user interface 132 includes an option 302 to block all data uploads for all devices 302. Therefore, each device identified by the computing device 102 or that has "opted in" as further described below is set to block communication of all marketing data.

The user interface 132 also includes options to permit or restrict communication of marketing data by individual ones of a plurality of computing devices, illustrated examples of which include a refrigerator 304, thermostat 306, and running shoes 308. The user interface 132 includes options for each of these devices to permit all 310, 312, 314 communication of marketing data, individually. Likewise, the user interface 132 also includes options for each of these devices to restrict all 316, 318, 320 communication of marketing data, individually. Thus, a user may select an option to permit all 310 marketing data communication for the refrigerator 310 but restrict all 318 communication of marketing data for the thermostat 306.

The user interface 132 also includes options to permit or restrict communication of the marketing data "by destination" 322, 324, 326 for individual devices or globally for all devices, e.g., to particular marketing data collection services 108, 110. For example, there may be instances in which a user does desire that the marketing data be communicated to a particular marketing data collection service 108 for the running shoes 308, such as an online fitness website, yet restrict this communication for another marketing data collection service 110, e.g., an online retailer as describe above. To do so, a user may select the retailers from a drop-down menu output in response to selection of the by destination 326 option.

The user interface 132 further includes options to permit or restrict communication of the marketing data "by type" 328, 330, 332 for individual devices and/or globally for all devices. A variety of different types of marketing data may be defined, such as personally identifiable data, data that describes user interaction with a respective device, operational data of the device, estimated remained usage available of the device (e.g., shoes based on miles run), geographic location of the device, data describing other devices that are in communication with the device, and so on. This data may vary as greatly as the functionality supported by the devices and thus a multitude of other types of marketing data are also contemplated.

Hierarchical and/or joint relationships may also be supported, such that a user may restrict individual types of marketing data to individual marketing data collection services for devices. Thus, the user interface 132 may be configured to receive inputs from a user to specify marketing data communication settings that may be used to control communication of marketing based on individual device, individual type of marketing data, and/or individual destination for the marketing data. The marketing data communication settings specified through interaction with the user interface 132 are then propagated to devices, further discussion of which is included in the following and shown in corresponding figures.

Figure 4:
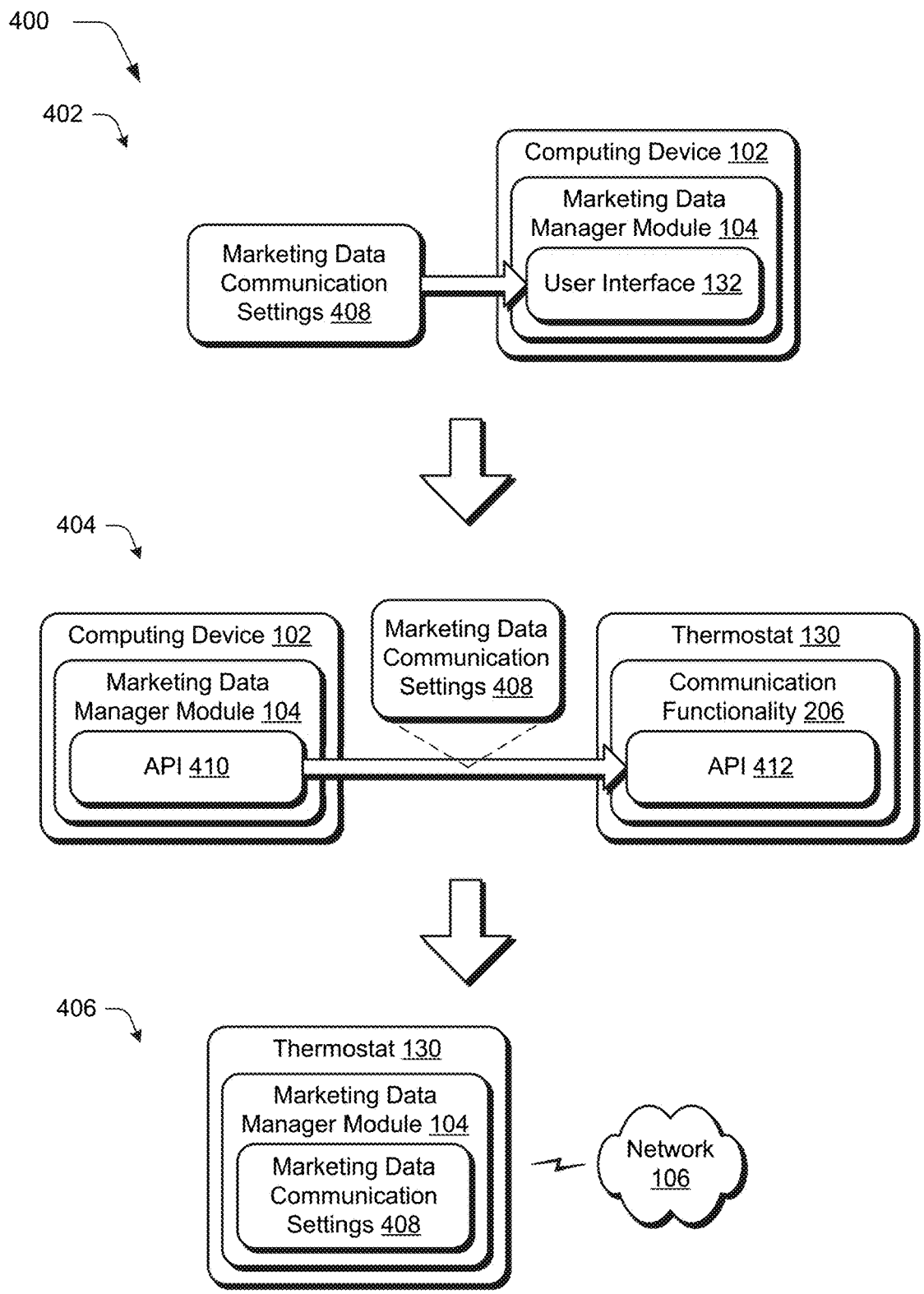
FIG. 4 depicts a system in an example implementation in which a result of user interact with the single unified user interface of FIG. 3 is propagated to other devices to control communication of marketing data.

FIG. 4 depicts a system 400 in an example implementation in which a result of user interact with the single unified user interface of FIG. 3 is propagated to other devices to control communication of marketing data. This system 400 is illustrated using first, second, and third stages 402, 404, 406. At the first stage 402 marketing data communication settings 408 are set through interaction by a user with the user interface 132 as described in relation to FIG. 3. To do so, the marketing data manager module 104 first locates devices that have marketing data to be controlled, which is performable in a variety of ways.

The marketing data manager module 104, for instance, may wirelessly "ping" other devices to locate the devices as part of an active discovery phase. In another instance, each of the devices may "opt-in" either manually through user interaction or automatically and without user interaction, such as to wirelessly communicate an identifier that is received by the marketing data manager module 104.

Regardless of what technique is used for discovery, a handshake process may be performed in which the marketing data manager module 104 determines what functionality, if any, is supported by the individual device to control marketing data communication. In one example, a manufacturer of the thermostat 130 includes a flag that is set to permit or restrict communication of marketing data generated by the thermostat 130 to the manufacturer. In response to this determination, the marketing data manager module 104 configures the user interface 132 to have an option to set this flag and thus takes advantage of functionality of the device itself without requiring the user to manually interact with the device, thereby increasing ease of use and unified control. A variety of other examples are also contemplated.

At the second stage 404, the marketing data communication settings are communicated via an API 410 of the marketing data manager module 104 to an API 412 of the communication functionality 206 of the thermostat 130, such as to set the flag as described in the above example. The thermostat 130 then employs the marketing data communication settings 408 to control communication of marketing data with the network 106 without communication of this data through the computing device 102. Other examples are also contemplated in which this data is communicated through the device, such as for control via the wireless router 112 example described in relation to FIG. 2.

Thus, the examples above describe a single unified user interface via which a user can specify control of types of marketing data by individual devices to individual marketing data collection services. In this way, a user may interact with the user interface to control devices within the digital environment 100 without requiring manual interaction with each of the devices or learning control techniques that are particular to the devices. Further discussion of these and other examples is included in the following procedure description.

Example Procedures

The following discussion describes marketing data communication control techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
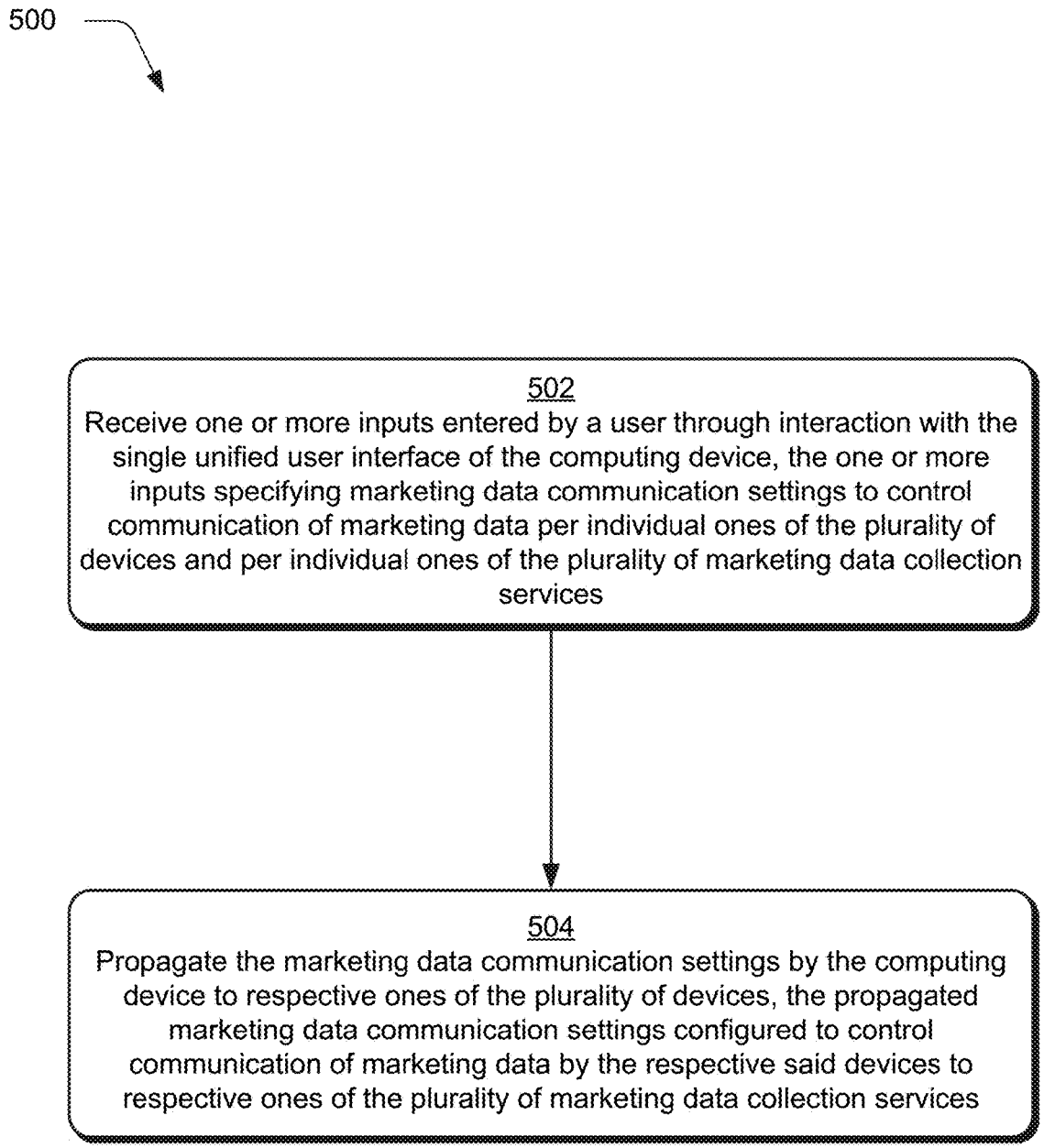
FIG. 5 is a flow diagram depicting a procedure in an example implementation in which techniques to control communication of marketing data are described.

FIG. 5 depicts a procedure 500 in an example implementation in which techniques to control communication of marketing data are described. A digital environment is described in which a plurality of devices are configured to communicate marketing data to one or more of a plurality of marketing services. In this digital environment, marketing data communication is controlled via a single unified user interface of a computing device. One or more inputs are received that are entered by a user through interaction with the single unified user interface of the computing device. The one or more inputs specify marketing data communication settings to control communication of marketing data per individual ones of the plurality of devices and per individual ones of the plurality of marketing data collection services (block 502).

A user, for instance, interacts with the user interface 132 of FIG. 3 to specify that a type of marketing data that describes inventory of a refrigerator is permitted to be sent to an online grocer but not elsewhere through use of "by type" 328 and "by destination" 322 options in the user interface 132 associated with the refrigerator 304. The user also specifies that a type of marketing data that describes temperature settings is permitted to be sent to a manufacturer of the device but not data that describes when presence of a user is detected through use of "by type" 330 and "by destination" 324 options in the user interface 132 associated with the thermostat 306.

The marketing data communication settings are propagated by the computing device to respective ones of the plurality of devices. The propagated marketing data communication settings are configured to control communication of marketing data by the respective devices to respective ones of the plurality of marketing data collection services (block 504). The marketing data manger module 104, for instance, then communicates marketing data communication settings 408 to the respective devices, e.g., the refrigerator and the thermostat 130 wirelessly. These devices are then configured to control communication of the marketing data without further interaction with the computing device 102 that originated the settings, thereby supporting self-reliance and robustness in operation of the devices.

FIG. 6 depicts another procedure 600 in an example implementation in which techniques to control communication of marketing data are described. As before, a digital environment is configured to control marketing data communication. A communication is transmitted by a device for receipt by a computing device to opt-in to functionality of the computing device to control communication of marketing data by the device that is collected by the device (block 602). A user, for instance, may install the thermostat 130 at a premises 202 such that the thermostat 130 is operational. The thermostat 130 then broadcasts an identifier periodically to other devices that is discoverable by the devices for inclusion as part of the marketing data communication control techniques described. In another instance, the opt-in is performed responsive to receipt of a communication from the marketing data manager module 104, which a user may then select to include the device as part of the system.

Marketing data communication settings are received by the device that are propagated by the computing device, the marketing data communication settings configured to control communication of individual types of the marketing data by the device to respective ones of a plurality of marketing data collection services (block 604). As described in relation to FIG. 5, user interaction with the user interface 132 is used to specify marketing data communication settings that are then used by the device to control marketing data communication. This may be used to control marketing data originated by the device itself or "passed through" from another device, such as part of the wireless router 112 example of FIG. 2. A variety of other examples are also contemplated.

Example System and Device

Figure 7:
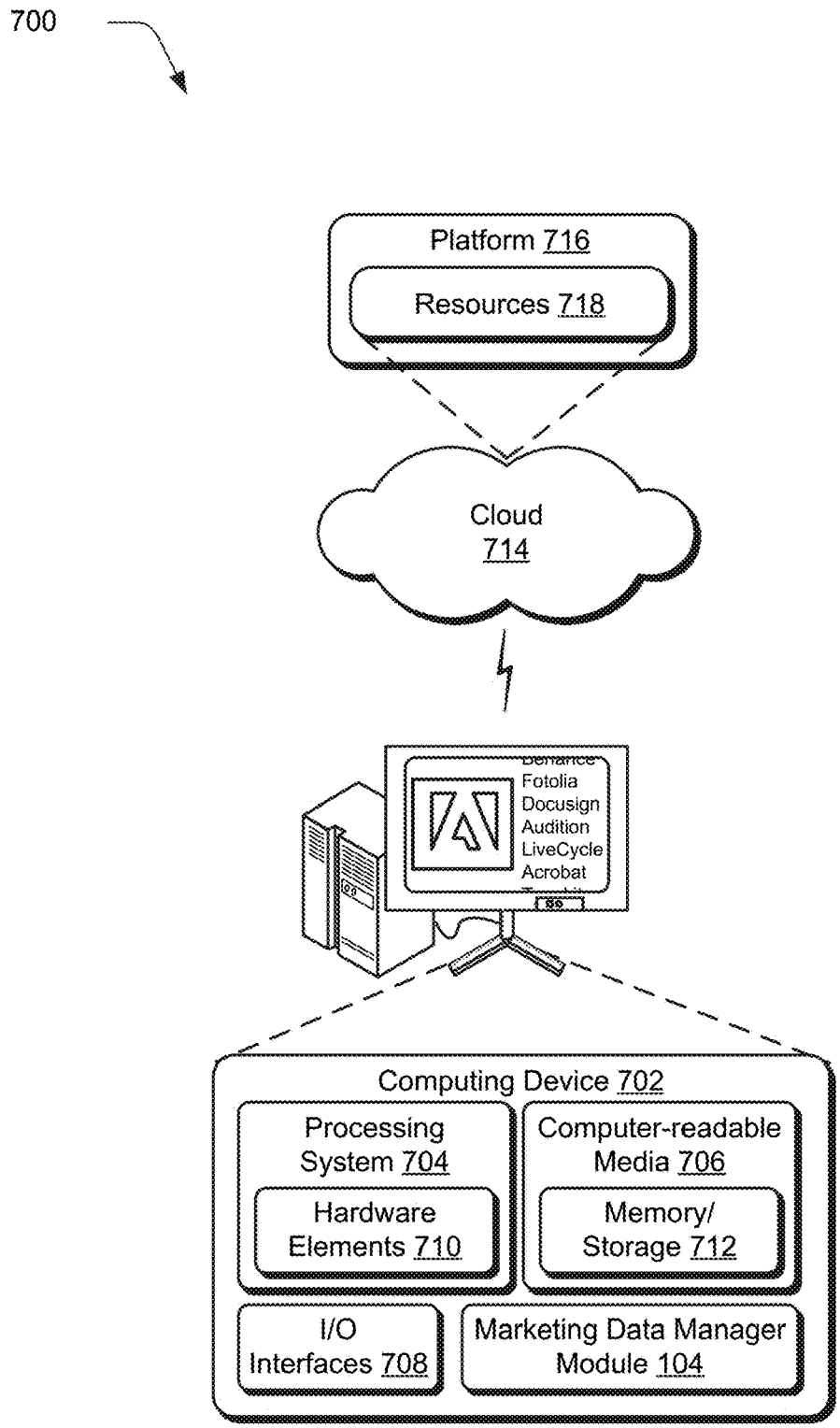
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the marketing data manager module 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital environment in which a plurality of devices are configured to communicate marketing data to one or more marketing data collection services, a method comprising:
   discovering, by a computing device, the plurality of devices via a network by performing a handshake process with each of the plurality of devices;
   causing, by the computing device, each of the plurality of devices to transmit information to the computing device describing functionality supported by the device that is usable to directly control sending of marketing data to the one or more marketing data collection services;
   generating, by the computing device, a single unified user interface including a plurality of options, each of the plurality of options being:
      visually associated with one of the plurality of devices and specifying a type of marketing data that the one of the plurality of devices is permitted to send or is restricted from sending; and
      selectable to invoke functionality supported by the one of the plurality of devices to directly control the sending of the marketing data by the one of the plurality of devices;
   displaying, by the computing device, the single unified user interface;
   receiving, by the computing device, user input at the single unified user interface, the user input comprising a selection of at least one of the plurality of options;

generating, by the computing device, a marketing data communication setting based on the input; and controlling, by the computing device, sending of the marketing data by the one of the plurality of devices by transmitting the marketing data communication setting to the one of the plurality of devices.

2. The method as described in claim 1, wherein the single unified user interface includes an option to control sending of individual ones of a plurality of different types of the marketing data.

3. The method as described in claim 1, wherein the marketing data communication setting is transmitted to control communication of marketing data by the one of the plurality of devices to the one or more marketing data collection services without direct user interaction at the one of the plurality of devices.

4. The method as described in claim 1, further comprising determining that the plurality of devices have opted-in for control of communication of the marketing data via the single unified user interface and transmitting the marketing data communication setting responsive to the determining.

5. The method as described in claim 1, further comprising determining that the plurality of devices support data communication with the single unified user interface and transmitting the marketing data communication setting responsive to the determining.

6. The method as described in claim 1, wherein transmitting the marketing data communication setting is configured based at least in part on the functionality supported by the one of the plurality of devices that is useable to control sending of the marketing data.

7. The method as described in claim 1, wherein transmitting the marketing data communication setting is configured based at least in part on marketing data communication control functionality specified by of the one or more marketing data collection services.

8. The method as described in claim 1, wherein the marketing data sent by the one of the plurality of devices is not sent through the computing device.

9. The method as described in claim 1, wherein the marketing data communication setting is configured to control sending of marketing data by the one of the plurality of devices by permitting the one of the plurality of devices to send marketing data to one of the one or more marketing data collection services and prohibiting the one of the plurality of devices from sending marketing data to a different one of the one or more marketing data collection services.

10. The method as described in claim 1, wherein the single unified user interface includes indications of opportunities to monetize collection of the marketing data by of the one or more marketing data collection services.

11. In a digital environment to control marketing data communication via a single unified user interface, a system comprising:
a display device;
a wireless communication device; and
a processing system and memory configured to implement a marketing data manager module configured to:
discover, by the processing system, a plurality of devices via a network by performing a handshake process with each of the plurality of devices;

cause, by the processing system, each of the plurality of devices to transmit information to the processing system describing functionality supported by the device that is usable to directly control sending of marketing data to a plurality of marketing data collection services;

generate, by the processing system, a single unified user interface including a plurality of options, each of the plurality of options being:
visually associated with one of the plurality of devices and specifying a type of marketing data that the one of the plurality of devices is permitted to send or is restricted from sending; and
selectable to invoke functionality supported by the one of the plurality of devices to directly control sending of the marketing data by the one of the plurality of devices;

display, by the processing system, the single unified user interface;

receive, by the processing system, user input at the single unified user interface, the user input comprising a selection of one of the plurality of options;

generate, by the processing system, a marketing data communication setting based on the user input; and control, by the processing system, sending of the marketing data by the one of the plurality of devices by transmitting the marketing data communication setting to the one of the plurality of devices.

12. The system as described in claim 11, wherein the marketing data communication setting is transmitted to control sending of marketing data by the one of the plurality of devices to the plurality of marketing data collection services without direct user interaction at the one of the plurality of devices.

13. The system as described in claim 11, wherein the marketing data manager module is further configured to determine that the plurality of devices have opted-in for control of sending of the marketing data via the single unified user interface and wherein the transmitting is performed responsive to the determining.

14. The system as described in claim 11, wherein the marketing data manager module is further configured to determine that the plurality of devices support data communication with the single unified user interface and wherein the transmitting is performed responsive to the determining.

15. The system as described in claim 11, wherein transmitting the marketing data communication setting is configured based at least in part on the functionality supported by the one of the plurality of devices that is useable to control sending of the marketing data.

16. The system as described in claim 11, wherein the marketing data communication setting is configured to control sending of marketing data by the one of the plurality of devices by permitting the one of the plurality of devices to send marketing data to one of the plurality of marketing data collection services and prohibiting the one of the plurality of devices from sending marketing data to a different one of the plurality of marketing data collection services.

17. The system as described in claim 11, wherein the single unified user interface includes indications of opportunities to monetize collection of the marketing data by the plurality of marketing data collection services.

* * * * *